_United States Patent Office_

3,325,496
Patented June 13, 1967

3,325,496
2,4,6-TRI-AMINO-SUBSTITUTED PYRIMIDINES
Stuart Walter Critchley, Hale Barns, and Frank Lamb, Chadderton, Oldham, England, assignors, by mesne assignments, to Geigy Chemical Corporation, Ardsley, N.Y., a corporation of Delaware
No Drawing. Filed Nov. 9, 1964, Ser. No. 409,993
Claims priority, application Great Britain, Nov. 12, 1963, 44,534/63
13 Claims. (Cl. 260—256.4)

The present invention relates to heterocyclic organic compounds and in particular to pyrimidine derivatives having valuable thermal stability and viscosity/temperature properties, enabling them to be used with advantage, for example, in lubricant compositions or other functional fluids.

Accordingly, the present invention comprises 2,4,6-tri-amino-substituted pyrimidines having the formula

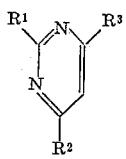

wherein $R^1$, $R^2$ and $R^3$ are the same or different and each is a substituent having the formula $-NR^4R^5$, or a nitrogen-containing heterocyclic group attached at the nitrogen atom thereof to the pyrimidine ring, the groups $R^4$ and $R^5$ being the same or different alkyl group.

The invention also comprises a process of producing substituted pyrimidines having the above formula, which comprises reacting a 6-halo-substituted pyrimidine having the formula

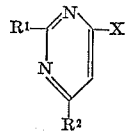

with the corresponding substituted amine $R^3H$, where $R^1$, $R^2$ and $R^3$ have their previous significance and X is a halogen atom.

Preferably groups $R^4$ and $R^5$ are straight or branched-chain alkyl groups containing from one to twenty carbon atoms, for example, methyl, ethyl, n-propyl, n-butyl, n-hexyl, n-octyl, 2-ethylhexyl, n-decyl or n-dodecyl groups; it is particularly preferred that either or both of $R^4$ and $R^5$ are straight-chain alkyl groups containing from one to twenty carbon atoms. If one or more of the groups $R^1$, $R^2$ and $R^3$ is a nitrogen-containing heterocyclic group, this may be, for example, a piperidino or alkyl-substituted piperidino group. The halogen X may be fluorine, bromine or iodine, but is preferably chlorine.

The substituted pyrimidines of the invention may be produced by contacting the 6-halo-substituted pyrimidine with the substituted amine in the presence of a compound capable of acting as a binding agent for the hydrogen halide formed by the reaction, for example an alkali metal carbonate. The reaction is conveniently carried out at an elevated temperature, preferably at a temperature in the range from 150° to 300° C. The reaction may be effected at substantially atmospheric pressure, but a superatmospheric pressure may in some cases be employed to advantage; for instance, if the normal boiling point of the amine is below 200° C., a sufficiently high reaction temperature may not be attainable at atmospheric pressure for completion of the reaction and it is then preferred to conduct the process at a superatmospheric pressure. For instance, if 2,4-di(di-n-butylamino)-6-chloro-pyrimidine is heated with di-n-butylamine (normal boiling point 160° C.) or with piperidine (normal boiling point 106° C.) at atmospheric pressure, the product may be contaminated with unreacted starting material, although the corresponding reaction at atmospheric pressure with di-n-pentylamine (normal boiling point 203° C.) proceeds substantially to completion. However, by operating the process at a superatmospheric pressure, preferably at a pressure of from 1.5 to 20 atmospheres, the reaction with such lower-boiling amines can be satisfactorily effected.

The desired 2,4,6-substituted pyrimidine may be separated from the reaction product by conventional methods. For example, the reaction product may be treated by a procedure comprising filtration and fractional distillation of the filtrate, preferably under an inert atmosphere, to yield the desired compound.

The 6-halo-substituted pyrimidine reacted with the substituted amine may be prepared, for example, by reacting a 2,4,6-trihalo-substituted pyrimidine having the formula:

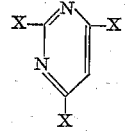

with the same or different amines having the formula $R^1H$ and $R^2H$, the groups X attached to the 2-, 4- and 6-positions in the pyrimidine ring being the same or different halogen atoms, X having its previous significance. The 2,4,6-trihalo-substituted pyrimidine may be, for example, 2,4,6-trichloro-pyrimidine, which may be prepared by reacting phosphorous oxychloride and N,N-dimethylphenylamine with barbituric acid.

The reaction may be carried out, for example, by contacting the 2,4,6-trihalo-substituted pyrimidine with the amine (where $R^1H$ and $R^2H$ represent one and the same amine) in the presence of alkali or other compound capable of binding hydrogen halide eliminated in the reaction, for instance an alkali metal hydroxide or carbonate. The reaction is conveniently effected in the presence of water, dioxan or other polar solvent, and it is desirable to employ three moles of the amine for every mole of the 2,4,6-trihalo-substituted pyrimidine. If $R^1H$ and $R^2H$ represent two different amines, the reaction may be carried out by contacting the trihalo-pyrimidine with an equimolar proportion of the first amine at a temperature not exceeding 10° C., and preferably at a temperature in the range from −10° C. to +10° C., for example by cooling the reactants in an ice/salt cooling bath. The resulting mixture may then be treated with alkali or other hydrogen halide-binding compound and allowed to react for one hour at a more elevated temperature, for example at 20° C. The second amine is then added conveniently at 20° C. and preferably employing two moles of the second amine for every mole of the 2,4,6-trihalo-pyrimidine originally taken. The mixture may then be heated, for instance for twelve hours at 100° C., with further hydrogen halide-binding compound.

The 6-halo-substituted pyrimidine produced may be recovered, if desired, by conventional methods, for example, by solvent extraction and fractional distillation under an inert atmosphere. Instead of recovering the pure 6-halo-substituted compound, the crude reaction product containing it, if desired, after partial purification, may be employed in subsequent reaction to produce the desired 2,4,6-triamino-substituted pyrimidine of the invention.

The desired 2,4,6-triamino-substituted pyrimidines may also be produced by reacting one molar proportion of the corresponding 2,4,6-trihalo-substituted pyrimidines directly with at least three molar proportions of the amine or amines R¹H, R²H and R³H. The reaction is preferably effected at an elevated temperature and at substantially atmospheric or at a superatmospheric pressure. A compound, such as an alkali metal carbonate, may be advantageously added to act as binding agent for hydrogen halide formed during the reaction.

The present invention also comprises formulations containing the 2,4,6-tri-amino-substituted pyrimidines and in particular formulations containing the compounds for use as lubricants or other functional fluids. Pyrimidine derivatives of the type described may with advantage be blended with conventional antioxidants such as phenyl α-naphthylamine or other di-arylamines, or hindered phenols such as 2,6-di-tertiarybutyl-4-methyl-phenol, together, if desired, with metal corrosion inhibitors such as benzotriazole. The 2,4,6-tri-amino-substituted pyrimidines have been found to have good thermal stability while at the same time possessing good viscosity/temperature properties, and the 2,4,6-tri-amino-substituted pyrimidines therefore have especial value as high temperature lubricants or other functional fluids for use at high temperatures.

The following examples further illustrate the present invention. Parts by weight shown therein bear the same relation to parts by volume as do kilograms to litres. Percentages are expressed by weight unless otherwise stated.

Example 1

A. Into a vessel fitted with an efficient stirrer, thermometer pocket, dropping funnel and reflux condenser were placed 120 parts by volume of dioxan and 200 parts by volume of water. After cooling the solution to a temperature not exceeding 10° C. using an ice/salt cooling bath, 55 parts by weight of 2,4,6-trichloro-pyrimidine were added and gradual addition of di-n-butyl-amine was commenced.

When 38.7 parts by weight of the di-n-butylamine had been added, 12 parts by weight of sodium hydroxide dissolved in 20 parts by volume of water were gradually added so as to keep the mixture slightly alkaline. After the addition of sodium hydroxide was complete, the cooling bath was removed and the mixture stirred for 1 hour. 77.4 parts by weight of di-n-butylamine were added in one portion, and the temperature raised to the boiling point of the mixture (about 100° C.). During the next 12 hours, 12 parts by weight of sodium hydroxide dissolved in 20 parts by volume of water were added in portions to the mixture which was heated and stirred under reflux.

The cold reaction mixture was extracted with diethyl ether, and the ether extract was washed with water and dried with anhydrous sodium sulphate. Solvent was removed and the crude product was distilled under nitrogen.

The product obtained was 91 parts by weight of the yellow mobile liquid 2,4,-bis-di-n-butylamino-6-chloro-pyramidine having boiling range 190° to 192° C. at 1.4 millimetres of mercury pressure and the following elemental analysis:

|  | Found | Calculated |
| --- | --- | --- |
| Carbon, percent | 65.3 | 65.2 |
| Hydrogen, percent | 10.5 | 10.1 |
| Nitrogen, percent | 15.1 | 15.2 |
| Chlorine, percent | 9.5 | 9.5 |

The yield was 83% theoretical.

B. 73.3 parts by weight of this product were introduced with 73.6 parts by weight of di-n-hexylamine and 27.6 parts by weight of anhydrous potassium carbonate, into a reactor fitted with a stirrer, nitrogen inlet and reflux condenser. A nitrogen stream was maintained passing through the reactor and the temperature of the stirred contents was kept at 210° to 230° C. for 24 hours. After allowing to cool, the reaction mixture was diluted with benzene and filtered. Solvent was removed from the filtrate and the crude product was purified by distillation under nitrogen.

The product, after being twice distilled under nitrogen, was the red brown liquid 2,4-bis(di-n-butyalamino)-6-di-n-hexylamino-pyrimidine, having boiling point 217° to 221° C. at 0.3 millimetre of mercury pressure and the following elemental analysis:

|  | Found | Calculated |
| --- | --- | --- |
| Carbon, percent | 74.1 | 74.2 |
| Hydrogen, percent | 12.1 | 12.2 |
| Nitrogen, percent | 13.6 | 13.5 |

The yield was 75% theoretical, based on the product from the second distillation.

Example 2

The procedure described in Example 1B was carried out using di-n-decylamine as the amine.

The product, after being twice distilled under nitrogen, was the red brown liquid 2,4-bis-(di-n-butylamino)-6-di-n-decylamino-pyrimidine, having boiling point 250° to 270° C. at 0.003 to 0.005 millimetre of mercury pressure and the following elemental analysis:

|  | Found | Calculated |
| --- | --- | --- |
| Carbon percent | 76.6 | 76.3 |
| Hydrogen, percent | 12.7 | 12.6 |
| Nitrogen, percent | 10.6 | 11.1 |

The yield was 57% theoretical, based on the product from the second distillation.

Example 3

The procedure described in Example 1B was carried out using di-n-dodecylamine as the amine.

The product after being twice distilled under nitrogen, was the red brown liquid 2,4-bis-(di-n-butylamino)-6-di-n-dodecylamino-pyrimidine, having boiling point 252° C. to 258° C. at 0.004 to 0.005 millimetre of mercury pressure and the following elemental analysis:

|  | Found | Calculated |
| --- | --- | --- |
| Carbon, percent | 77.1 | 77.2 |
| Hydrogen, percent | 12.8 | 12.7 |
| Nitrogen, percent | 10.0 | 10.2 |

The yield was 40% theoretical, based on the product from the second distillation.

Example 4

The procedure described in Example 1A was carried out using di-n-propylamino instead of the di-n-butylamino, and using the 2,4-bis-(di-n-propylamino)-6-chloro-pyrimidine as the 6-halo-pyrimidine and di-n-hexylamine as the amine in the procedure described in Example 1B.

The product, after being twice distilled under nitrogen, was the red brown liquid 2,4-bis-(di-n-propylamino)-6-di-n-hexylamino-pyrimidine, having boiling point 200° to 206° C. at 0.3 millimetre of mercury pressure and the following elemental analysis:

|  | Found | Calculated |
| --- | --- | --- |
| Carbon, percent | 72.8 | 72.9 |
| Hydrogen, percent | 12.0 | 11.8 |
| Nitrogen, percent | 15.4 | 15.3 |

The yield was 74% theoretical, based on the product from the first distillation.

Example 5

A. Into a reactor fitted with a stirrer, thermometer and reflux condenser were placed 250 parts by volume of dioxan and 150 parts by volume of water. After cooling this solution to below 10° C. with an ice/salt cooling bath, 259 parts by weight of 2,4,6-trichloro-pyrimidine were added and gradual addition of diethylamine was commenced. When 103 parts by weight of the amine had been added, an aqueous solution of 56.5 parts by weight of sodium hydroxide in 100 parts by volume of water were gradually added so as to keep the mixture just alkaline. After all the sodium hydroxide solution had been introduced, the mixture was maintained below 10° C. with stirring for 1 hour.

The cooling bath was then removed, 365 parts by weight of di-n-butylamino were added in one portion and the mixture was boiled under reflux. 56.5 parts by weight of sodium hydroxide in 100 parts by volume of water were added in portions during the next 12 hours to the stirred refluxing mixture.

After cooling, the reaction mixture was extracted with diethyl ether, and the ether extract was washed with water and dried with anhydrous sodium sulphate. Solvent was removed and the crude product was distilled under nitrogen.

The product obtained was 370 parts by weight of the yellow mobile liquid diethylamino-di-n-butylamino-6-chloro-pyrimidine having boiling point 142° to 152° C. at 0.4 millimetre of mercury pressure and elemental analysis:

|  | Found | Calculated |
|---|---|---|
| Carbon, percent | 61.4 | 61.5 |
| Hydrogen, percent | 9.4 | 9.3 |
| Nitrogen, percent | 18.0 | 17.9 |
| Chlorine, percent | 11.1 | 11.4 |

The yield was 84% theoretical. The product may be 2-diethylamino-4-di-n-butylamino-6-chloro-pyrimidine or 2-di-n-butylamino-4-diethylamino-6-chloro-pyrimidine or a mixture of the two compounds.

B. The procedure described in Example 1B was carried out using the product of Example 5A as the 6-halo-pyrimidine.

The product was the red brown liquid diethylamino-di-n-butylamino-6-di-n-hexylamino-pyrimidine having boiling point 200° to 202° C. at 0.3 millimetre of mercury pressure and the elemental analysis:

|  | Found | Calculated |
|---|---|---|
| Carbon, percent | 72.9 | 72.9 |
| Hydrogen, percent | 11.6 | 11.8 |
| Nitrogen, percent | 15.1 | 15.3 |

The yield was 67% theoretical. The product may be 2-diethylamino-4-di-n-butylamino-6-di-n-hexylamino-pyrimidine or 2-di-n-butylamino-4-diethylamino-6-di-n-hexylamino-pyrimidine or a mixture of the two compounds.

Example 6

A. The procedure described in Example 1A was carried out, using, instead of the di-n-butylamine, an equimolar mixture of diethylamine, di-n-propylamine and di-n-butylamine.

The product was a liquid having boiling point range 156° to 166° C. at 0.4 millimetre of mercury pressure and the elemental analysis:

|  | Found | Calculated |
|---|---|---|
| Carbon, percent | 63.5 | 61.0 |
| Hydrogen, percent | 9.4 | 9.2 |
| Nitrogen, percent | 16.9 | 17.8 |
| Chlorine, percent | 10.6 | 11.6 |

The yield was 65% theoretical.

B. The procedure described in Example 1B was carried out using the product of Example 6A as the 6-halo-pyrimidine.

The red brown liquid product, after being twice distilled under nitrogen, was the corresponding 6-di-n-hexylamino-pyrimidine mixture having boiling range 200° to 216° C. at 0.5 millimetre of mercury pressure and elemental analysis:

|  | Found | Calculated |
|---|---|---|
| Carbon, percent | 72.8 | 72.9 |
| Hydrogen, percent | 12.0 | 11.8 |
| Nitrogen, percent | 15.5 | 15.3 |

The yield was 72% theoretical, based on the product from the first distillation.

Example 7

A. The procedure described in Example 6A was carried out using instead of the amine mixture there specified, an equimolar mixture of di-n-propylamine, di-n-butylamine and di-n-pentylamine.

The product was a liquid having boiling range 178° to 195° C. at 0.6 millimetre of mercury pressure and the elemental analysis:

|  | Found | Calculated |
|---|---|---|
| Carbon, percent | 65.2 | 65.2 |
| Hydrogen, percent | 10.1 | 10.1 |
| Nitrogen, percent | 15.0 | 15.2 |
| Chlorine, percent | 9.5 | 9.6 |

The yield was 68% theoretical.

B. The procedure described in Example 6B was carried out using the product of Example 7A as the 6-halo-pyrimidine.

The red brown liquid product, after being twice distilled under nitrogen, was the corresponding 6-di-n-hexylamino-pyrimidine mixture having boiling range 210° to 235° C. at 0.5 to 0.7 millimetre of mercury pressure and the elemental analysis:

|  | Found | Calculated |
|---|---|---|
| Carbon, percent | 73.3 | 74.2 |
| Hydrogen, percent | 11.9 | 12.2 |
| Nitrogen, percent | 14.1 | 13.6 |

The yield was 65% theoretical, based on the product from the second distillation.

Example 8

110 parts by weight of 2,4-bis-di-n-butylamino-6-chloro-pyrimidine, 155 parts by weight of di-n-butylamino and 41.4 parts by weight of anhydrous potassium carbonate were placed in a stainless steel autoclave fitted with a mechanical stirrer. The autoclave was sealed, flushed out several times with nitrogen and then pressurised with about 10 atmospheres of nitrogen. Stirring was commenced and the temperature of the mixture was raised over 5 hours to 200° to 240° C. and maintained within this temperature range for 24 hours, the pressure being about 30 atmospheres.

The reactor and contents were then allowed to cool and the reaction mixture was diluted with chloroform. The mixture was filtered and the residue washed with chloroform. After removing chloroform from the filtrate, the crude product was distilled to give 90 parts by weight of 2,4,6-tris-di-n-butylamino-pyrimidine, having boiling point 190° to 194° C. at 0.3 millimetre of mercury pressure; the yield was 65% theoretical.

After further purification by re-distillation, the product was a red brown liquid. By dissolving in petroleum ether (boiling range 60° to 80° C.), passing through a column of alumina, and removing the solvent, 2,4,6-tris-di-n-butylamino-pyrimidine was obtained as a yellow liquid, having the elemental composition:

|  | Found | Calculated |
| --- | --- | --- |
| Carbon, percent | 72.6 | 72.9 |
| Hydrogen, percent | 11.9 | 11.8 |
| Nitrogen, percent | 15.5 | 15.3 |

Example 9

The procedure described in Example 8 was carried out using piperidine instead of the di-n-butylamine.

The product was 2,4-bis-di-n-butylamino-6-piperidine-pyrimidine, a red liquid having boiling point 210° to 216° C. at 0.3 millimetre of mecury pressure and elemental analysis:

|  | Found | Calculated |
| --- | --- | --- |
| Carbon, percent | 72.2 | 72.0 |
| Hydrogen, percent | 11.2 | 11.3 |
| Nitrogen, percent | 16.8 | 16.7 |

Example 10

36.7 parts by weight of 2,4,6-trichloro-pyrimidine, 148 parts by weight of di-n-hexylamine and 82.8 parts by weight of anhydrous potassium carbonate were placed in a reactor fitted with a nitrogen inlet, stirrer and reflux condenser. A stream of nitrogen was continuously passed through the reactor during reaction; stirring was commenced and the temperature of the reactor contents was gradually raised over several hours by means of an air bath to about 250° C. and the reaction mixture was thus heated for 24 hours.

102 parts by weight of the product 2,4,6-tris-di-n-hexyl-amino-pyrimidine, was recovered as described in Example 1 and was a liquid having boiling range 242° to 260° C. at 0.5 millimetre of mercury pressure; the yield was 81% theoretical. On being re-distilled and treated with alumina, as described in Example 8, the compound was obtained as a yellow liquid having boiling range 260° to 270° C. at 0.5 millimetre of mercury pressure, solidifying to a waxy solid after standing for several weeks at room temperature. The elemental analysis was as follows:

|  | Found | Calculated |
| --- | --- | --- |
| Carbon, percent | 76.2 | 76.5 |
| Hydrogen, percent | 12.5 | 12.6 |
| Nitrogen, percent | 11.3 | 11.1 |

Example 11

The procedure described in Example 1A was carried out, using diethylamine instead of the di-n-butylamine there used. The product was 2,4-bis-diethylamino-6-chloropyrimidine having boiling range 123° to 127° C. at 0.5 millimetre of mercury pressure. The yield was 82% theoretical.

This intermediate product was then subjected to the procedure described in Example 1B. The product was 2,4-bis-diethylamino-6-di-n-hexylamino-pyrimidine, having boiling point 192° to 194° C. at 0.5 millimetre of mercury pressure and the following elemental analysis:

|  | Found | Calculated |
| --- | --- | --- |
| Carbon, percent | 71.0 | 71.1 |
| Hydrogen, percent | 11.7 | 11.7 |
| Nitrogen, percent | 17.3 | 17.3 |

The yield was 86% theoretical.

Example 12

The procedure described in Example 1A was carried out using di-n-pentylamine instead of the di-n-butylamine there used. The product was 2,4-bis-di-n-pentylamino-6-chloropyrimidine having boiling range 178° to 184° C. at 0.5 millimetre of mercury pressure. The yield was 69% theoretical.

This intermediate product was then subjected to the procedure described in Example 1B, using di-iso-pentyl-amine instead of the di-n-hexylamine there used. The product was 2,4,6-tris-di-n-pentylamino-pyrimidine having a boiling point 212° to 219° C. at 0.25 millimetre or mercury pressure and the following elemental analysis:

|  | Found | Calculated |
| --- | --- | --- |
| Carbon, percent | 74.4 | 74.8 |
| Hydrogen, percent | 12.3 | 12.4 |
| Nitrogen, percent | 12.9 | 12.8 |

The yield was 83% theoretical.

Example 13

The procedure described in Example 1A was carried out using di-iso-pentylamine instead of the di-n-butylamine there used. The product was 2,4-bis-di-iso-pentylamino-6-chloropyrimidine, having boiling range 184° to 187° C. at 0.4 millimetre of mercury pressure and the following elemental analysis:

|  | Found | Calculated |
| --- | --- | --- |
| Carbon, percent | 67.2 | 67.8 |
| Hydrogen, percent | 10.9 | 10.6 |
| Nitrogen, percent | 13.8 | 13.2 |
| Chlorine, percent | 8.3 | 8.4 |

The yield was 85% theoretical.

This intermediate product was then subjected to the procedure described in Example 1B. The product was 2,4-bis-di-iso-pentylamino-6-di-n-hexylamino-pyrimidine having boiling point 235° to 239° C. at 0.2 millimetre of mercury pressure and the following elemental analysis:

|  | Found | Calculated |
| --- | --- | --- |
| Carbon, percent | 75.1 | 75.3 |
| Hydrogen, percent | 12.5 | 12.5 |
| Nitrogen, percent | 12.3 | 12.2 |

The yield was 92% theoretical.

The 2,4,6-tri-amino-substituted pyrimidines of the present invention have been found to have good thermal stability, as measured, for instance, by the isoteniscope method (Blake et al., Journal of Chemical and Engineering Data, 1961, volume 6, No. 1, at page 87). In this test, a small sample (2 to 4 millilitres) of the compound is maintained at a series of temperatures. The rate of increase of vapour pressure ($dp/dt$) is determined at each temperature, T. The values of log $dp/dt$ are plotted graphically against the corresponding values of $1/T$ and the temperature at which the rate of increase of vapour pressure is 0.014 millimetre of mercury per second is taken as the decomposition point. The decomposition points of some of the 2,4,6-tri-amino-substituted pyrimidines produced in the foregoing examples are given in the following table.

| Compound of Example No. | Decomposition point (° C.) | Viscosity in centistokes | | A.S.T.M. Slope 210° to 100° F. | Solidification or gelation temperature (° C.) |
|---|---|---|---|---|---|
| | | 210° F. | 100° F. | | |
| 1 | 330 | 12.2 | 112 | 0.682 | −15 |
| 2 | 330 | 9.11 | 57.9 | 0.641 | −34 |
| 3 | 330 | 7.61 | 79.9 | 0.810 | −30 |
| 5 | 325 | 10.5 | 101 | 0.719 | −50 |
| 8 | 325 | 6.35 | 38.8 | 0.705 | −10 |

In the table, the A.S.T.M. slope referred to is the slope of the curve plotted between any two temperatures on A.S.T.M. viscosity/temperature chart D–341. The solidification or gelation temperature referred to in the table is determined as follows:

10 to 15 millilitres of the test fluid are stored in a refrigerator for 24 hours at 0° C., then examined visually, for changes in appearance, for instance, cloudiness, crystallinity, or partial or complete solidification. This is followed by consecutive 24 hour storage periods at −10°, −20°, −30°, −40°, −54°, −40°, −30°, −20°, −10° and 0° C. with examinations after each 24 hours. By this test it is possible to evaluate the low temperature properties of lubricants, especially when materials which are subject to supercooling are to be examined.

From the data given in this table, it is clearly evident that the 2,4,6 - tri-amino-substituted pyrimidine compounds of the present invention have good viscosity/temperature properties, while at the same time possessing high thermal stability. The compounds are, therefore, valuable lubricants or other functional fluids, alone or in admixture with other fluids, antioxidants, anti-corrosion agents or other conventional additives.

As an instance of the excellent lubricant properties of the compounds of the present invention, the results of lubricity tests carried out on a typical compound, namely that of Example 5, are given below. The results were obtained from the Shell 4-ball half hour wear test. The test conditions were as follows:

Duration _____minutes__ 30
Ambient temperature _____° C__ 21
Half inch grade ASKF steel ball bearings used.
Speed of rotation _____r.p.m__ 1420

The results of the test were as follows:

Millimetre
Scar diameter (1 kilogram load) _____ 0.151
Scar diameter (40 kilograms load) _____ 0.548

We claim:
1. A 2,4,6-tri-amino-substituted pyrimidine having the formula

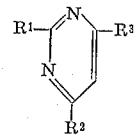

wherein each of $R^1$, $R^2$ and $R^3$ is a member selected from the group consisting of dialkylamino, each alkyl of which has from 1 to 20 carbon atoms, and piperidino with the proviso that the total number of alkyl carbon atoms present is at least 16.

2. A substituted pyrimidine as defined in claim 1, wherein at least one alkyl group is present which is a member selected from the group consisting of methyl, ethyl, n-propyl, n-butyl, n-hexyl, n-octyl, 2-ethylhexyl, n-decyl and n-dodecyl.

3. A substituted pyrimidine as defined in claim 1, wherein at least one of the groups $R^1$, $R^2$ and $R^3$ is piperidino.

4. 2,4 - bis-(di-n-butylamino) - 6-di-n-hexylaminopyrimidine.

5. 2,4 - bis-(di-n-butylamino) - 6-di-n-decylamino-pyrimidine.

6. 2,4 - bis-(di-n-butylamino) - 6-di-n-dodecylamino-pyrimidine.

7. 2,4 - bis-(di-n-propylamino) - 6-di-n-hexylamino-pyrimidine.

8. 2,4,6-tris-(di-n-butylamino)-pyrimidine.

9. 2,4-bis-(di-n-butylamino) - 6-piperidino-pyrimidine.

10. 2,4,6-tris-(di-n-hexylamino)-pyrimidine.

11. 2,4-bis-(diethylamino) - 6-di-n-hexylamino-pyrimidine.

12. 2,4,6-tris-(di-n-pentylamino)-pyrimidine.

13. 2,4 - bis-(di-iso-pentylamino) - 6 - di-n-hexylamino-pyrimidine.

References Cited

UNITED STATES PATENTS 2,957,876  10/1960  Rudner _____ 260—256.4
3,118,754  1/1964   Nickell _____ 260—256.4 X

FOREIGN PATENTS 174,377  3/1953  Austria.
162,149  4/1964  U.S.S.R.

ALEX MAZEL, *Primary Examiner.*

MARY U. O'BRIEN, *Assistant Examiner.*